(12) United States Patent
Shao et al.

(10) Patent No.: US 12,058,215 B2
(45) Date of Patent: *Aug. 6, 2024

(54) METHODS, INDUSTRIAL INTERNET OF THINGS SYSTEMS, AND STORAGE MEDIUMS FOR CONTROLLING PRODUCTION LINE DETECTION DATA

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yaqiang Quan, Chengdu (CN); Haitang Xiang, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,602

(22) Filed: Feb. 5, 2023

(65) Prior Publication Data

US 2023/0188603 A1 Jun. 15, 2023

Related U.S. Application Data

(63) Continuation of application No. 17/807,144, filed on Jun. 16, 2022, now Pat. No. 11,641,401.

(30) Foreign Application Priority Data

Apr. 18, 2022 (CN) .......................... 202210401816.X

(51) Int. Cl.
*H04L 67/12* (2022.01)
*G16Y 10/25* (2020.01)
*G16Y 40/10* (2020.01)

(52) U.S. Cl.
CPC .............. *H04L 67/12* (2013.01); *G16Y 10/25* (2020.01); *G16Y 40/10* (2020.01)

(58) Field of Classification Search
CPC ........ G16Y 10/25; G16Y 40/10; H04L 67/12; H04L 67/025
See application file for complete search history.

(56) References Cited

U.S. PATENT DOCUMENTS 6,801,822 B1 * 10/2004 Fujiwara .......... G05B 19/41875
707/999.107
2018/0270082 A1 9/2018 Menschner
(Continued)

FOREIGN PATENT DOCUMENTS

CN 102355696 A 2/2012
CN 104144149 A 11/2014
(Continued)

OTHER PUBLICATIONS

Shao, Zehua, Exploration and Research on the Structure of Internet of Things, Internet of Things Technologies Reliable Transmission, 2015, 10 pages.
(Continued)

*Primary Examiner* — Jason D Recek
(74) *Attorney, Agent, or Firm* — METIS IP LLC

(57) ABSTRACT

Methods, industrial Internet of Things systems, and storage mediums for controlling production line detection data are provided. The industrial Internet of Things system includes a user platform, a service platform, a management platform, a sensor network platform, and an object platform. The service platform and the management platform use a centralized arrangement. The management platform sends a data request and receives production line detection data. The sensor network platform uses an arrangement of a front sub-platform, the sensor network platform includes a total platform and a plurality of sub-platforms, the sub-platforms are child node gateway devices in different communication networks, and the total platform is a total node gateway device aggregated by all the communication networks. The sensor network platform retrieves the production line detection data from the total node gateway device or the child node gateway devices based on a data request sent by the management platform.

15 Claims, 6 Drawing Sheets

(56) References Cited

U.S. PATENT DOCUMENTS

2020/0344299 A1    10/2020    Sohail et al.
2021/0208571 A1*    7/2021    Thomsen ......... G05B 19/41875

FOREIGN PATENT DOCUMENTS

| CN | 106502234 A | 3/2017 |
|---|---|---|
| CN | 107819819 A | 3/2018 |
| CN | 111417178 A | 7/2020 |
| CN | 112783129 A | 5/2021 |
| CN | 112969212 A | 6/2021 |
| CN | 113141381 A | 7/2021 |
| EP | 3043298 A1 | 7/2016 |

OTHER PUBLICATIONS

Shao, Zehua, The Internet of Things sense the world beyond the world, China Renmin University Press, 2017, 30 pages.

Shao, Zehua, Smart City Architecture, Internet of Things Technologies Intelligent Processing and Application, 2016, 7 pages.

Decision to grant a patent in Chinese Application No. 202210401816.X mailed on Jun. 22, 2022, 5 pages.

Xing, Sen et al., Niagara-Based Production Line Management System for the Internet of Things, Mechanical Research & Application, 34(6): 182-185, 2021.

Yan, Yan et al., Predictive Maintenance of Production Line Equipment in Industrial Workshops, Practical Electronics, 33-37, 2022.

* cited by examiner

200

210
Receiving a data request sent from a management platform, the data request including at least one type of production line detection data, the production line detection data being detected by at least one production line sensor of an object platform

220
Obtaining the detected at least one type of the production line detection data and storing it in the child node gateway devices or the total node gateway device

230
Based on the production line detection data included in the data request, retrieving the production line detection data from the total node gateway device or the child node gateway devices

240
Sending the retrieved production line detection data to the management platform

510
Determining an estimated amount of data corresponding to the at least one type of the production line detection data

520
Determining an estimated occupancy rate of a child node gateway device corresponding to the at least one type of the production line detection data based on the estimated amount of data

530
When the estimated occupancy rate is larger than a first threshold, retrieving the production line detection data from the total node gateway device

FIG. 5

METHODS, INDUSTRIAL INTERNET OF THINGS SYSTEMS, AND STORAGE MEDIUMS FOR CONTROLLING PRODUCTION LINE DETECTION DATA

CROSS-REFERENCE TO RELATED APPLICATIONS

This application is a Continuation of U.S. patent application Ser. No. 17/807,144 filed on Jun. 16, 2022, which claims priority of Chinese Patent Application No. CN202210401816.X, filed on Apr. 18, 2022, the entire contents of which are incorporated herein by reference.

TECHNICAL FIELD

The present disclosure generally relates to the field of intelligent manufacturing, and in particular, to methods, industrial Internet of Things systems, and storage mediums for controlling production line detection data.

BACKGROUND

Intelligent manufacturing technology refers to the intelligent detection and control technology for production line by relying on the industrial Internet of Things (IoT), which belongs to the technical field of key research in current industrial production. Different interfaces used by different devices of the production lines and different communication protocols between data are important factors for the data transmission of the industrial IoT and the realization of intelligent manufacturing.

Therefore, it is desirable to provide more reliable methods, industrial Internet of Things systems, and storage mediums for controlling production line detection data with more efficient transmission of related data of industrial IoT.

SUMMARY

The one or more embodiments of the present disclosure provide a method for controlling production line detection data, wherein: the sensor network platform uses an arrangement of a front sub-platform, and the arrangement of the front sub-platform is that the sensor network platform includes a total platform and a plurality of sub-platforms, the sub-platforms are child node gateway devices in different communication networks, and the total platform is a total node gateway device aggregated by all the communication networks, the method being executed by the sensor network platform, the method comprising: receiving a data request sent from a management platform, the data request including at least one type of production line detection data, the production line detection data being detected by at least one production line sensor of an object platform, wherein the at least one production line sensor is divided into multiple types according to a type of a communication protocol, and the multiple types of the production line sensor are added to different communication networks; obtaining the detected at least one type of the production line detection data and storing it in the child node gateway devices or the total node gateway device; based on the production line detection data included in the data request, retrieving the production line detection data from the total node gateway device or the child node gateway devices; and sending the retrieved production line detection data to the management platform.

The one or more embodiments of the present disclosure provide an industrial Internet of things system for controlling production line detection data comprising a user platform, a service platform, a management platform, a sensor network platform, and an object platform that interact in sequence, wherein: the service platform and the management platform use a centralized arrangement, and the centralized arrangement means that any platform uniformly receives data, uniformly processes data, and uniformly sends data; the management platform is used to send a data request and receive production line detection data; the sensor network platform uses an arrangement of a front sub-platform, and the arrangement of the front sub-platform is that the sensor network platform includes a total platform and a plurality of sub-platforms, the sub-platforms are child node gateway devices in different communication networks, and the total platform is a total node gateway device aggregated by all the communication networks, the sensor network platform is configured to: receive a data request sent from a management platform, the data request including at least one type of production line detection data, the production line detection data being detected by at least one production line sensor of the object platform, wherein the at least one production line sensor is divided into multiple types according to a type of a communication protocol, and the multiple types of the production line sensor are added to different communication networks; obtain the detected at least one type of the production line detection data and store it in the child node gateway devices or the total node gateway device; based on the production line detection data included in the data request, retrieve the production line detection data from the total node gateway device or the child node gateway devices; and send the retrieved production line detection data to the management platform.

The one or more embodiments of the present disclosure provide a non-transitory computer-readable storage medium storing computer instructions, wherein when reading the computer instructions in the storage medium, a computer implements the method of described above.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2 is an exemplary flowchart illustrating a controlling method for front sub-platform industrial IoT according to some embodiments of the present disclosure;

FIG. 5 is an exemplary flowchart illustrating a process for retrieving the production line detection data based on an estimated amount of the production line detection data according to some embodiments of the present disclosure.

DETAILED DESCRIPTION

Figure 1:
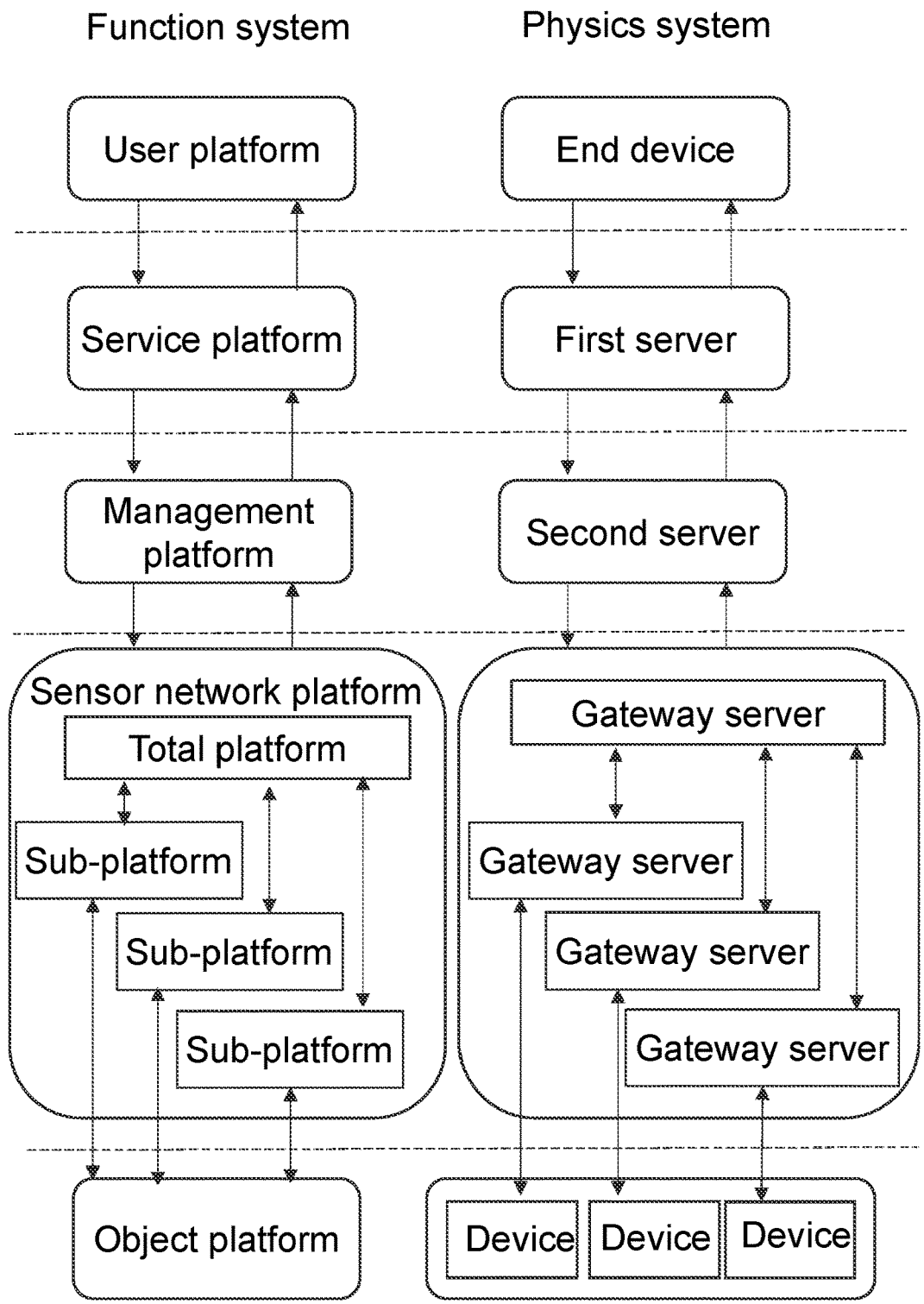
FIG. 1 is a schematic diagram illustrating a communication architecture of front sub-platform industrial Internet of things (IoT) according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise; and the plural forms may be intended to include the singular forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram illustrating a communication architecture of front sub-platform industrial Internet of things (IoT) according to some embodiments of the present disclosure.

An industrial Internet of Things refers to an information processing system formed by various platforms that realize various functions in the industrial production process. As shown in FIG. 1, a front sub-platform industrial IoT 100 includes a user platform, a service platform, a management platform, a sensor network platform, and an object platform that interacts in sequence.

A user platform may be a platform for interacting with users. In some embodiments, the user platform may be configured as an end device, for example, the end device may include a mobile device, a tablet computer, a laptop computer, an in-vehicle device, etc., or any combination thereof. In some embodiments, the user platform may be used to receive input instructions of a user (e.g., a request to query certain types of production line detection data). In some embodiments, the user platform may be communicating with (which means interacting with) the service platform. The user platform may send the input instruction to the management platform via the service platform, and receive data and/or information required by the user platform extracted from the management platform via the service platform.

The service platform may be a platform for receiving and transmitting data and/or information. In some embodiments, the service platform may be configured as a first server for communicating with the user platform and the management platform. In some embodiments, the service platform may receive the instruction of the user platform and send it to the management platform, and extract the information needed to process the user platform from the management platform, and send it to the user platform. In some embodiments, the service platform may use a centralized arrangement, wherein the centralized arrangement means that any one platform uniformly receives data, uniformly processes data, and uniformly sends data.

The management platform may be a platform for managing and transmitting data and/or information. In some embodiments, the management platform may be configured as a second server for communicating with the service platform and the sensor network platform. In some embodiments, the management platform may transmit data and/or information (e.g., data requests entered by the user platform) to the sensor network platform. In some embodiments, the management platform may also control the operation of the object platform based on the sensor network platform, and receive feedback data (e.g., production line detection data) from the object platform. In some embodiments, the management platform may use a centralized arrangement.

In some embodiments, the management platform is further configured with a plurality of sub-platforms for separately processing different types of production line detection data. Specifically, since the centralized management platform generally faces a lot of computing pressure, on the basis of the centralized management platform, the calculation of the centralized management platform may be apportioned by adding sub-platforms to reduce the calculated pressure of the centralized management platform. An allocation method may be performed by using a distributed computing method in the prior art, such as load balancing or elastic container, and details are not described herein again.

The sensor network platform may be a platform for processing, storing and transmitting data and/or information. In some embodiments, the sensor network platform is configured as a communication network (not shown) and at least one gateway server for interacting with the object platform and the management platform. In some embodiments, the sensor network platform may process and store the detected production line detection data by the object platform. The sensor network platform may retrieve corresponding data and/or information and send it to the management platform in response to the data request sent by the management platform.

In some embodiments, the sensor network platform may use an arrangement of a front sub-platform, and the arrangement of the front sub-platform is that the sensor network platform includes a total platform and a plurality of sub-platforms. A plurality of sub-platforms may separately store and process data and/or information (e.g., the different types of the production line detection data sent by the object platform). The total platform aggregates the data and/or information of the plurality of sub-platforms, stores and processes them, and transmits them to the management platform. In some embodiments, the sub-platforms are child node gateway devices in different communication networks, and the total platform is the total node gateway device aggregated by all communication networks in the sensor network platform. If the management platform requests the production line detection data from the sensor network platform, the sensor network platform may retrieve the production line detection data from the child node gateway devices or the total node gateway device according to the requested production line detection data and send it to the management platform. For more information about the child node gateway device and the total node gateway device, please refer to FIG. 2 and its related descriptions.

It should be understood that the child platform (sub platform) of the above management platform is different from the child platform (sub platform) of the sensor network platform. The child platform of the management platform is only used for calculating or storing data and/or information, while the child platform of the sensor network platform may also be used for data transmission, and its working mode is more independent than that of the child platform of the management platform.

The object platform may be a functional platform for obtaining data and/or information related to an object, and the object may be a production line. In some embodiments, the object platform is configured as one or more production line devices and production line sensors that perform manufacturing. The production line device refers to the device used to produce and manufacture products, such as a grinding machine tool, an automatic packaging machine and other devices. The production line sensor refers to instrument used to detect production line detection data (such as real-time output data of product, operation data of production device), such as a photoelectric sensor, a Hall sensor, a camera and other sensor or information acquisition device. In some embodiments, when the production line sensor on (of) the object platform sends the detected production line detection data to the sensor network platform, the sensor network platform may send the production line detection data to the child node gateway in the same communication network as the production line sensor. In some embodiments, production line sensors of the object platform may be classified according to the types of communication protocols, and each type of production line sensor may be added to different communication networks. In some embodiments, production line sensors of the same communication protocol may communicate through the same child node gateway device. This process is referred to as "networking process" for short, and the networking mode may be a star network or a bus network. If it is a star network, the child node gateway device is the central gateway device of the star network; if it is a bus network, the child node gateway device may be chosen to connect to the bus, or a bus management module may be chosen as the child node gateway device. For more information of the communication protocol, please refer to FIG. 2 and its related description.

In some embodiments, the object platform may be communicated with the sensor network platform. In response to the data request sent by the management platform, the production line sensor of the object platform may send the detected production line detection data to the sensor network platform. In some embodiments, based on the aforementioned communication network, when the production line sensor uploads data (that is, sends the production line detection data to the sensor network platform), the production line detection data in the same communication network may be aggregated and uniformly stored and encoded at the child node gateway device of the communication network. Through some embodiments of the present disclosure, the coding efficiency may be effectively improved, and there is no need to equip each production line sensor with a separate protocol conversion device or module. For more details on sending the detected production line detection data to the sensor network platform, please refer to FIG. 3 and its related descriptions.

In some embodiments of the present disclosure, the intelligent manufacturing industrial IoT is constructed in the form of a five-platform structure. Since the service platform and the management platform use a centralized arrangement, and the sensor network platform uses an arrangement of a front sub-platform, the sensor network platform may classify and receive data sent by production line sensors corresponding to different communication protocols in the object platform, effectively reducing the overall system complexity and improving system stability.

It should be noted that the above description of the industrial IoT is only for the convenience of description, and does not limit the present specification to the scope of the illustrated embodiments. It may be understood that for those skilled in the art, after understanding the principle of the system, various modules may be combined arbitrarily, or a sub-system may be formed to connect with other modules without departing from the principle. In some embodiments, the user platform, the service platform, the management platform, the sensor network platform, and the object platform disclosed in FIG. 1 may be different components in the industrial IoT, or may also be that one component implements the functions of the above-mentioned two or more components, for example, the sensor network platform and the management platform may be integrated in one component, for another example, each component may share one storage device, and each component may also have its own storage device. Such deformations are all within the protection scope of the present disclosure.

FIG. 2 is an exemplary flowchart illustrating a controlling method for front sub-platform industrial IoT according to some embodiments of the present disclosure. In some embodiments, a process 200 may be applied to the front sub-platform industrial IoT in FIG. 1. In some embodiments, the process 200 may be performed by a sensor network platform. As shown in FIG. 2, the process 200 includes the following steps.

Step 210, receiving a data request sent from a management platform, the data request including at least one type of production line detection data, the production line detection data being detected by at least one production line sensor of an object platform.

The data request refers to a request to obtain data related to industrial production, for example, a request to obtain production line detection data, etc. In some embodiments, the data request includes the at least one type of production line detection data.

Production line detection data refers to detection data related to the industrial production line, for example, the production line detection data may include production data of a product, operation data of a production line device, workload data of workers, and the like.

In some embodiments, the production line detection data may be detected by the at least one production line sensor (e.g., a photoelectric sensor, a Hall sensor, a camera, etc.) on the object platform, for example, the photoelectric sensor may be used to detect real-time yield data of the product.

In some embodiments, the type of production line detection data refers to a type of a communication protocol of the corresponding production line sensor. In some embodiments, the type of the communication protocol may include TCP/IP protocol, IPX/SPX protocol, NetBEUI protocol, etc. If the communication protocol of production line sensor A is TCP/IP protocol, and the communication protocol of production line sensor B is IPX/SPX protocol, then the production line sensor A and the production line sensor B are different types of production line sensors, which are added to two different communication networks and communicate with child node gateway devices in the respective communication networks, respectively. For more on the object platform and production line sensor, please refer to FIG. 1 and its associated description.

In some embodiments, the type of production line detection data may also refer to a process type of the corresponding production line, for example, production line detection data related to instrument assembly, production line detection data related to packaging, etc.

In some embodiments, the sensor network platform may receive the data request from the management platform. In some embodiments, after the user platform receives an input instruction from the user (e.g., a request to query a certain type of production line detection data), the service platform receives the input instruction from the user platform and sends it to the management platform, and the management platform may send the data request to the sensor network platform based on the input instruction. Based on this, the sensor network platform may receive the data request sent from the management platform.

Step 220, obtaining the detected at least one type of the production line detection data and storing it in child node gateway devices or the total node gateway device.

The child node gateway device may be a corresponding gateway device in different communication networks on the sensor network platform. The total node gateway device may be a corresponding gateway device aggregated by all communication networks on the sensor network platform.

In some embodiments, after the child node gateway device receives the production line detection data detected by the production line sensor from the same communication network, the sensor network platform may compile the production line detection data according to the communication protocol of the corresponding communication network and store the compiled production line detection data in a database of the child node gateway device. The child node gateway device of the same communication network is used to store the same type of production line detection data.

In some embodiments, the child node gateway device may send the compiled production line detection data to the total node gateway device. The total node gateway device may aggregate the compiled production line detection data and store it in a database of the total node gateway. For more instructions on obtaining the detected production line detection data and storing it to the child node gateway devices or the total node gateway device, please refer to FIG. 3 and its related descriptions.

Step 230, based on the production line detection data included in the data request, retrieving the production line detection data from the total node gateway device or the child node gateway devices.

In some embodiments, the sensor network platform may retrieve the production line detection data from the total node gateway device or from the child node gateway device according to the amount of types of the production line detection data. For more information on retrieving production line detection data according to the amount of types of production line detection data, please refer to FIG. 4 and its related descriptions.

In some embodiments, the sensor network platform may retrieve the production line detection data from the total node gateway device or from the child node gateway device according to an estimated amount of data of the production line detection data. For more information on retrieving production line detection data according to the estimated amount of data of production line detection data, please refer to FIG. 5 and its related descriptions.

Step 240, sending the retrieved production line detection data to the management platform.

In some embodiments, the sensor network platform may send the retrieved production line detection data to the management platform.

In some embodiments, when the sensor network platform retrieves the production line detection data from the child node gateway device, a first time sequence table may also be sent to the management platform. In some embodiments, when the sensor network platform retrieves the production line detection data from the total node gateway device, a second time sequence table may also be sent to the management platform. For more contents of the first sequence table and the second sequence table, please refer to FIG. 4 and related descriptions.

In some embodiments of the present disclosure, the sensor network platform with front sub-platform arrangement enables the sensor network platform to receive and classify production line detection data sent by sensors of different communication protocols on the object platform, which realizes the classified transmission of data, saves the cost of transcoding between different communication protocols, reduces the overall system complexity and improves system stability.

It should be noted that the above description about the process 200 is only for example and illustration, and does not limit the scope of application of the present disclosure. For those skilled in the art, various modifications and changes may be made to the process 200 under the guidance of the present disclosure. However, these corrections and changes are still within the scope of this specification.

Figure 3:
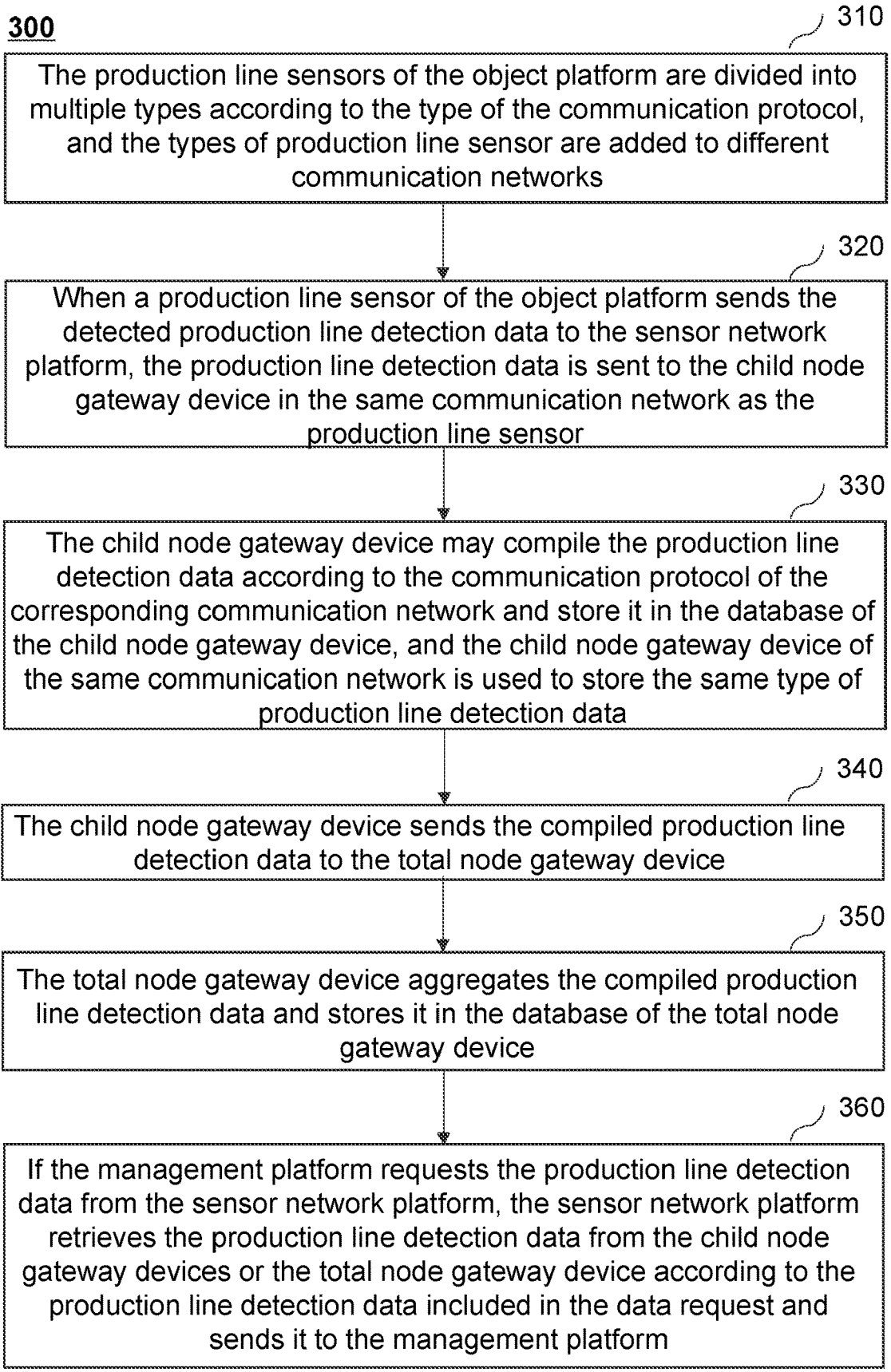
FIG. 3 is another exemplary flowchart illustrating a controlling method for front sub-platform industrial IoT according to some embodiments of the present disclosure.

FIG. 3 is another exemplary flowchart illustrating a process of controlling method for front sub-platform industrial IoT according to some embodiments of the present disclosure. In some embodiments, a process 300 may be applied to the front sub-platform industrial IoT in FIG. 1. In some embodiments, the process 300 may be performed by the sensor network platform. As shown in FIG. 3, the process 300 includes the following steps.

Step 310, the production line sensors of the object platform are divided into multiple types according to the type of the communication protocol, and the types of production line sensor are added to different communication networks.

In some embodiments, production line sensors of the same communication protocol may communicate through the same child node gateway device.

Step 320, when a production line sensor of the object platform sends the detected production line detection data to the sensor network platform, the production line detection data is sent to the child node gateway device in the same communication network as the production line sensor.

Step 330, the child node gateway device may compile the production line detection data according to the communication protocol of the corresponding communication network and store it in the database of the child node gateway device, and the child node gateway device of the same communication network is used to store the same type of production line detection data. In some embodiments, the sensor network platform may compile the production line detection data obtained by the production line sensor into a machine-recognizable format, for example, a binary format. Common compilers include g++ compiler, GNU compiler, Turbo C compiler, etc.

Step 340, the child node gateway device sends the compiled production line detection data to the total node gateway device.

Step 350, the total node gateway device aggregates the compiled production line detection data and stores it in the database of the total node gateway device.

Step 360, if the management platform requests the production line detection data from the sensor network platform, the sensor network platform retrieves the production line detection data from the child node gateway devices or the total node gateway device according to the requested production line detection data and sends it to the management platform.

In some embodiments, the sensor network platform may, based on the production line detection data included in the data request, retrieve the production line detection data from the total node gateway device or the child node gateway device. The specific steps include: determining an amount of types of the production line detection data included in the data request; when the amount of types is larger than or equal to a first preset value, retrieving the production line detection data from the total node gateway device and sending it to the management platform; when the amount of types is less than a first preset value, retrieving the production line detection data from the child node gateway device and sending it to the management platform. For details on retrieving production line detection data according to the amount of types of production line detection data, please refer to FIG. 4 and its related descriptions.

In some embodiments, the sensor network platform may, based on an estimated amount of data of the production line detection data included in the data request, retrieve the production line detection data from the total node gateway device or the child node gateway devices. The specific steps include: determining an estimated amount of data corresponding to the at least one type of the production line detection data; determining an estimated occupancy rate of the child node gateway device corresponding to the at least one type of the production line detection data based on the estimated amount of data; when the estimated occupancy rate is larger than a first threshold, retrieving the production line detection data from the total node gateway device. For details on retrieving production line detection data according to the estimated amount of data of production line detection data, please refer to FIG. 5 and its related descriptions.

It should be noted that the above description about the process 300 is only for example and illustration, and does not limit the scope of application of the present disclosure. For those skilled in the art, various modifications and changes may be made to the process 300 under the guidance of the present disclosure. However, these corrections and changes are still within the scope of this specification.

Figure 4:
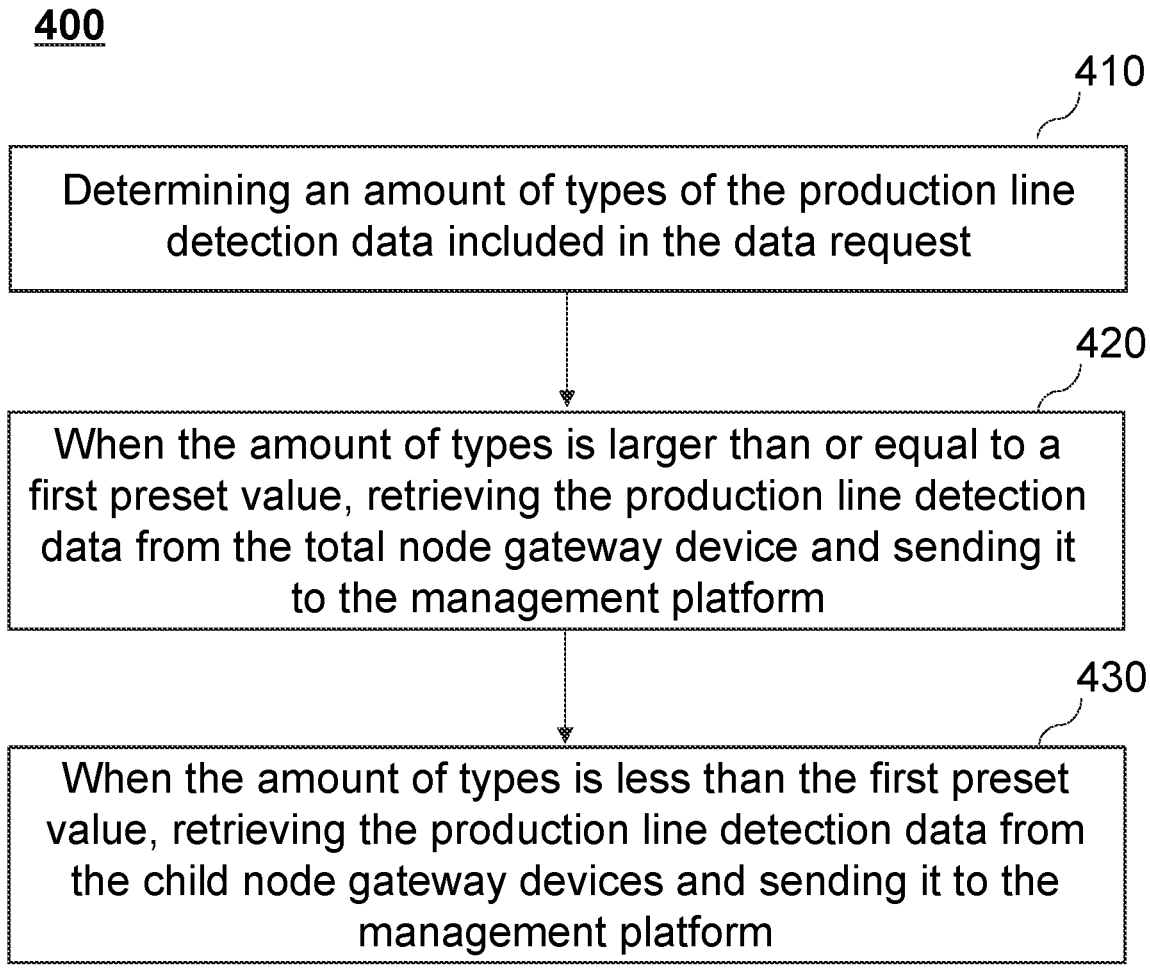
FIG. 4 is an exemplary flowchart illustrating a process for retrieving the production line detection data based on an amount of types of the production line detection data according to some embodiments of the present disclosure.

FIG. 4 is an exemplary flowchart illustrating a process of retrieving the production line detection data based on an amount of types of the production line detection data according to some embodiments of the present disclosure. In some embodiments, the process 400 may be performed by the sensor network platform. As shown in FIG. 4, the process 400 includes the following steps.

Step 410, determining an amount of types of the production line detection data included in the data request.

In some embodiments, a type of production line detection data refers to a type of a communication protocol of a production line sensor corresponding to the production line detection data. Correspondingly, the amount of types of the production line detection data may be an amount of types of the corresponding communication protocols.

In some embodiments, the amount of types of the production line detection data may be determined by the amount of types of the corresponding communication protocols.

Step 420, when the amount of types is larger than or equal to a first preset value, retrieving the production line detection data from the total node gateway device and sending it to the management platform.

The first preset value may be a preset value related to the amount of types of the production line detection data. In some embodiments, the first preset value may be obtained according to the computing bearing capacity of the child node gateway device and the total node gateway device, for example, the first preset value may be a ratio of the sum of the computing capability of all the child node gateway devices to the computing capability of the total node gateway device, where a computing capability is obtained through computing threads of a device and the computing speed of each thread.

In some embodiments, when the amount of types of the production line detection data is larger than or equal to a first preset value, the sensor network platform may retrieve the production line detection data from the total node gateway device and send it to the management platform.

Step 430, when the amount of types is less than the first preset value, retrieving the production line detection data from the child node gateway devices and sending it to the management platform.

In some embodiments, when the amount of types of the production line detection data is less than the first preset value, the sensor network platform may retrieve the production line detection data from the child node gateway device and send it to the management platform, to save the computing resource of the total node gateway device.

The advantage of the embodiment is that the pressure of data uploading is distributed from the total node gateway device to each child node gateway device, thereby reducing the delay of data uploading.

In some embodiments, each of the plurality of child node gateway devices is configured with a same time sequence.

The time sequence may be a sequence related to the time at which the production line detection data is received. In some embodiments, the time sequence may be determined according to the order in which the child node gateway devices receive production line detection data. In some embodiments, the time sequence may also be determined according to the order in which production line sensor detect production line detection data.

In some embodiments, for any one of the plurality of child node gateway devices, when receiving the production line detection data, generating at least one first time sequence value of the production line detection data according to the time sequence.

The first time sequence value may include production line detection data and an order in which the production line detection data is received, for example, the first time sequence value of the production line detection data a may be a:t, where t is the time sequence value at which the production line detection data a is received.

In some embodiments, the sensor network platform may generate the first time sequence value according to the order in which the child node gateway device receives the production line detection data, for example, when production line detection data m1 is received, the corresponding order is t1, then the first time sequence value is t1:m1.

In some embodiments, the sensor network platform may generate a first time sequence table based on the at least one first time sequence value.

The first time sequence table may be a combination of multiple first time sequence values. In some embodiments, the first time sequence table includes the correspondence between the production line detection data and first time sequence values.

In some embodiments, the sensor network platform may generate a first time sequence table according to the generated at least one first time sequence value. Exemplarily, the order in which the production line detection data m1, m5, and m6 are received are t1, t2, and t3, respectively, and the corresponding first time sequence values are t1:m1, t2:m5, and t3:m6, respectively, and the first time sequence table may be determined as: {t1:m1, t2:m5, t3:m6}.

In some embodiments, when the sensor network platform retrieves the production line detection data from the child node gateway device, the sensor network platform may send the first time sequence table to the management platform.

Since different production line sensors or child node gateway devices may detect or receive production line detection data at different times, the time sequences corresponding to the production line detection data may be different, which may affect the monitoring of the production line. Therefore, by setting the time sequence in all the child node gateway devices, the time sequence of all the child node gateway devices may be unified. Based on this, a table of production line detection data corresponding to the same time sequence in a communication network may be formed as a data supply basis, which effectively improves the integrity of production line detection data, avoids inconsistent of the time sequences corresponding to different child node gateway devices, and affects production line monitoring.

In some embodiments, the sensor network platform may obtain the at least one first time sequence table based on the total node gateway device, and splice the at least one first time sequence table according to the time sequence to form a second time sequence table.

The second time sequence table may be a combination of the at least one first time sequence table.

In some embodiments, the total node gateway device may obtain the at least one first time sequence table, and splice the obtained the at least one first time sequence table according to the time sequence to form the second time sequence table, for example, the first time sequence table of child node gateway device 1 is {t1: m1, t5: m2}, and the first time sequence table of child node gateway device 2 is {t2: n1, t3: n2}, then the second time sequence table formed by splicing may be {t1: m1, t2: n1, t3: n2, t5: m2}.

In some embodiments, when the sensor network platform retrieves the production line detection data from the total node gateway device, the sensor network platform may send the second time sequence table to the management platform.

The first time sequence table is formed into the second time sequence table according to the same time sequence through the total node gateway device, which facilitates the provision and search of data. Since the second time sequence table is implemented according to the first time sequence table, the same time sequence relationship may be formed between the total node gateway device and all the child node gateway devices. Whether the management platform obtains data from child node gateway devices or the total node gateway device, the time sequence of which is unified, thereby providing a good foundation for later data processing.

It should be noted that the above description about the process 400 is only for example and illustration, and does not limit the scope of application of the present disclosure. For those skilled in the art, various modifications and changes may be made to the process 400 under the guidance of the present disclosure. However, these corrections and changes are still within the scope of this specification.

FIG. 5 is an exemplary flowchart illustrating a process of retrieving the production line detection data based on an estimated amount of the production line detection data according to some embodiments of the present disclosure. As shown in FIG. 5, the process 500 includes the following steps.

Step 510, determining an estimated amount of data corresponding to the at least one type of the production line detection data.

The estimated amount of data may be an estimated amount of data of the at least one type of production line detection data in a preset time period, where the preset time period is a preset period of time (e.g., 20 s).

In some embodiments, the sensor network platform may determine the estimated amount of data corresponding to the at least one type of production line detection data by looking up a comparison table, wherein the comparison table includes a production line feature of the production line detection data and the corresponding estimated amount of data. A production line feature refers to a feature related to the production line, for example, including an amount of production line device, a product output, product productivity, production period, etc. Exemplarily, the comparison table includes production line feature a and the corresponding estimated amount of data M, production line feature b and the corresponding estimated amount of data N. By looking up the comparison table, the estimated amount of data of the production line detection data of the production line feature a is M, which may be determined. In some embodiments, the comparison table may be derived based on historical production line detection data.

In some embodiments, determining, by the sensor network platform, the corresponding estimated amount of data by clustering the at least one type of production line detection data may include: obtaining a plurality of sample data, each sample data including a first feature of a production line and a first amount of data corresponding to the sample data; clustering the plurality of sample data to obtain a set of cluster centers based on the first feature of the each sample data; determining a production line feature corresponding to the at least one type of the production line detection data; determining a target cluster center corresponding to the at least one type of the production line detection data from the set of cluster centers based on the production line feature; determining a second amount of data corresponding to the target cluster center; and determining the estimated amount of data corresponding to the at least one type of the production line detection data based on the second amount of data of the target cluster center. For details on determining the estimated amount of data, please refer to FIG. 6 and its related descriptions.

In some embodiments, when the estimated amount of data corresponding to the at least one type of production line detection data, a data divergence corresponding to the at least one type of the production line detection data may be determined, and the data divergence is negatively correlated with the first threshold.

Step 520, determining an estimated occupancy rate of a child node gateway device corresponding to the at least one type of the production line detection data based on the estimated amount of data.

The estimated occupancy rate may be a ratio of the estimated amount of data to a gateway capacity (i.e., the maximum carrying capacity) of the corresponding child node gateway device, for example, the estimated occupancy rate may be 80%, which means that the production line detection data accounts for 80% of the gateway capacity of the corresponding child node gateway device.

In some embodiments, after the estimated amount of data and the gateway capacity of the corresponding child node gateway device is determined, the sensor network platform may determine the estimated occupancy rate of the child node gateway device. The gateway capacity of the child node gateway device is an inherent parameter of the gateway device, and the sensor network platform may determine the gateway capacity of the child node gateway device by querying the nameplate or manual on the gateway device. In fact, due to factors such as the environment where the gateway is located, an actual gateway capacity of the child node gateway device during use may be less than the gateway capacity. Therefore, the estimated occupancy rate of the child node gateway device may be determined by the actual gateway capacity of the child node gateway device.

In some embodiments, the sensor network platform may determine a first data carrying capacity of the child node gateway device, and determine the estimated occupancy rate of the child node gateway device based on the first data carrying capacity and the estimated amount of data.

The first data carrying capacity may be an actual available capacity of the child node gateway device.

In some embodiments, the sensor network platform may process the gateway capacity of the child node gateway device and an environment feature of the child node gateway device by using a determination model to determine the first data carrying capacity of the child node gateway device. The feature of the environment where the child node gateway device is located (also referred to as the environment feature) includes at least the amount of transmission channels, the amount of connected devices (the amount of production line sensors in the same communication network with the child node gateway device), and a data transmission feature of each device.

The determination model may be used to determine the first data carrying capacity of the child node gateway device. In some embodiments, the determination model may be a deep learning model, for example, a deep neural network (DNN), a convolutional neural network (CNN), a recurrent neural network (RNN), or the like.

In some embodiments, the input of the determination model includes the gateway capacity of the child node gateway device and the feature of the environment where the child node gateway device is located, and the output may be the first data carrying capacity of the child node gateway device.

The parameters of the determination model may be obtained through training. In some embodiments, the determination model may be obtained based on a plurality of labeled training samples, for example, the sensor network platform may input a plurality of labeled training samples into the initial determination model, construct a loss function based on the labels and the prediction results of the initial determination model, and update the parameters of the initial determination model iteratively based on the loss function. When the loss function of the initial determination model satisfies a preset condition, the model training is completed. The preset condition may be that the loss function converges, the number of iterations reaches a threshold, etc.

In some embodiments, a training sample may include a sample gateway capacity and a historical environment feature of a child node gateway device. A label may be a historical first data carrying capacity of the corresponding child node gateway device. In some embodiments, training samples may be obtained based on historical data, and labels may be obtained by a manual annotation.

When determining the first data carrying capacity of the child node gateway device, the determined first data carrying capacity may be more in line with the actual situation of the child node gateway device by considering the influence of environment feature of the gateway capacity of the child node gateway device. At the same time, the first data carrying capacity of the child node gateway device may be accurately and efficiently determined through a machine learning model. Further, the estimated occupancy rate of the child node gateway device may be accurately determined, which is more in line with the actual processing situation of the child node gateway device.

Step 530, when the estimated occupancy rate is larger than a first threshold, retrieving the production line detection data from the total node gateway device.

The first threshold may be a threshold related to the estimated occupancy rate of the child node gateway device. In some embodiments, the first threshold may be a preset value, for example, the first threshold may be 1 or a value close to 1, such as 0.9, 0.8, or the like.

In some embodiments, the first threshold is negatively correlated with the data divergence, and the first threshold may be calculated and determined according to a first preset algorithm (i.e., a preset algorithm for calculating the first threshold). An exemplary first preset algorithm is shown in the following formula (1):

$$x = 1 - a \times d \qquad (1),$$

where x denotes the first threshold, a denotes the coefficient, and d denotes the data divergence.

The data divergence d is larger, that is, the data is more divergent, the corresponding first threshold is smaller. For more on the data divergence, please refer to FIG. 6 and its associated description.

When the estimated occupancy rate is larger than the first threshold, since there may be a deviation between the estimated amount of data and the actual amount of data of the production line detection data, the actual occupancy rate may be larger than the estimated occupancy rate. At this time, the production line detection data is retrieved from the total node gateway device, which is more in line with the actual processing capability of the gateway device.

In some embodiments, in response to the data request sent by the management platform, when the estimated occupancy rate is larger than the first threshold, the sensor network platform may retrieve the production line detection data included in the data request from the total node gateway device.

When the occupancy rate of the child node gateway device exceeds the first threshold, the uploading of the production line detection data may be delayed. The production line detection data is retrieved through the total node gateway device, which may ensure the accuracy and integrity of the data and reduce the delay of data uploading.

In some embodiments, the production line detection data may also be retrieved from the total node gateway device according to the occupancy rate ranking of the child node gateway device, which may specifically include the content described in the following steps S1 to S5.

S1, determining an occupancy rate ranking of the child node gateway device corresponding to the at least one type of the production line detection data.

The occupancy rate ranking may refer to a ranking order of the estimated occupancy rate of the child node gateway device corresponding to the at least one type of production line detection data.

In some embodiments, the sensor network platform may rank the estimated occupancy rates of the child node gateway devices in an ascending order to determine the occupancy rate ranking, for example, the estimated occupancy rates of the child node gateway devices a, b, and c are 10%, 60%, and 40% in sequence, and the occupancy rate ranking may be determined to be [a, c, b].

S2, determining at least one preselected data based on the occupancy rate ranking and a second preset value.

The second preset value may be a preset value related to the occupancy rate ranking, for example, the second preset value is 5, which may represent the top five in the occupancy rate ranking. In some embodiments, the second preset value may be preset through experience.

The preselected data may be the corresponding production line detection data filtered out by comparing the occupancy rate ranking with the second preset value.

In some embodiments, the sensor network platform may determine the production line detection data of the child node gateway device whose estimated occupancy rate ranking is less than the second preset value as the preselected data, for example, the second preset value is 5, and the sensor network platform may determine the production line detection data of five child node gateway devices whose estimated occupancy rates rank in the top five as the preselected data.

S3, determining an allocation occupancy rate of the total node gateway device corresponding to the at least one preselected data.

The allocation occupancy rate may be a ratio of the at least one preselected data to the gateway capacity of the total node gateway device. In some embodiments, after determining an estimated amount of data corresponding to the at least one preselected data and the gateway capacity of the total node gateway device, the sensor network platform may determine the allocated occupancy rate of the total node gateway device. Similar to the gateway capacity of the child node gateway device, the actual gateway capacity of the total node gateway device during use may be less than the gateway capacity. Therefore, the allocation occupancy rate of the total node gateway device may be determined by the actual gateway capacity of the total node gateway device.

In some embodiments, when determining the allocated occupancy rate of the total node gateway device corresponding to the at least one preselected data, the sensor network platform may determine second data carrying capacity of the total node gateway device. Then, based on the estimated amount of data and the second data carrying capacity corresponding to the at least one preselected data, the sensor network platform may determine the allocation occupancy rate of the total node gateway device.

The second data carrying capacity may be an actual available capacity of the total node gateway device. The second data carrying capacity of the total node gateway device is similar to the first data carrying capacity of the child node gateway device, and may also be determined by the machine learning model. For more content of the determination method, please refer to step 520 and its related description.

In some embodiments, the allocation occupancy rate of the total node gateway device may be determined by a ratio of the sum of the estimated amount of data corresponding to the at least one preselected data to the second data carrying capacity of the total node gateway device.

S4, determining at least one target detection data based on the allocated occupancy rate and a second threshold.

The second threshold may be a threshold related to the allocated occupancy rate of the total node gateway device. In some embodiments, the second threshold may be preset. In some embodiments, the second threshold is negatively correlated with the data divergence, and the second threshold may be calculated and determined according to a second preset algorithm (i.e., a preset algorithm for calculating the second threshold). An exemplary second preset algorithm is shown in the following formula (2):

$$y = 1 - (a_1 \times d_1 + \ldots + a_m \times d_m)/m \qquad (2),$$

where y denotes the second threshold, m denotes the number of preselected data, $d_1, \ldots, d_m$ denote the divergences corresponding to preselected data 1, ..., and preselected data m, respectively, $a_1, \ldots, a_m$ denote coefficient values (preset) corresponding to the preselected data 1, ..., and the preselected data m, respectively. For details of the data divergence, please refer to FIG. 6 and its related descriptions.

Alternatively, an exemplary second preset algorithm may also be shown in the following formula (3):

$$y = \frac{\sum_1^m k - (a_1 \times d_1 \times k_1 + \ldots a_m \times d_m \times k_m)}{\sum_1^m k}, \qquad (3)$$

where y denotes the second threshold, $\sum_1^m k$ denotes the sum of the estimated amount of data of the m preselected data, and $k_1, \ldots, k_m$ denote the estimated amount of data corresponding to the preselected data 1, ..., and the preselected data m, respectively.

Similar to the meaning of the first threshold, since there may be a deviation between the estimated amount of data and the actual amount of data of the production line detection data, when the second threshold is determined based on the data divergence, the data divergence corresponding to each preselected data is larger, the second threshold corresponding to the allocation occupancy rate is smaller. Therefore, by determining the second threshold based on the data divergence, the processing method for determining data (e.g., target detection data, the second threshold) is more accurate and more in line with the actual processing capability of the gateway.

In some embodiments, when determining the at least one target detection data based on the allocated occupancy rate and the second threshold, the sensor network platform may determine the at least one preselected data with the allocated occupancy rate less than the second threshold as the target detection data.

S5, retrieving the at least one target detection data from the total node gateway device.

In some embodiments, in response to the data request sent by the management platform, when the occupancy rate ranking is less than the second preset value and the allocated occupancy rate is less than the second threshold, the sensor network platform may retrieve the at least one target detection data from the total node gateway device.

By selecting the target detection data, the data that may not be processed by the child node gateway device is allocated to the total gateway (total node gateway device), which further improves the data transmission speed and reduces the delay of data uploading.

It should be noted that the above description about the process 500 is only for example and illustration, and does not limit the scope of application of the present disclosure. For those skilled in the art, various modifications and changes may be made to the process 500 under the guidance of the present disclosure. However, these corrections and changes are still within the scope of this specification.

Figure 6:
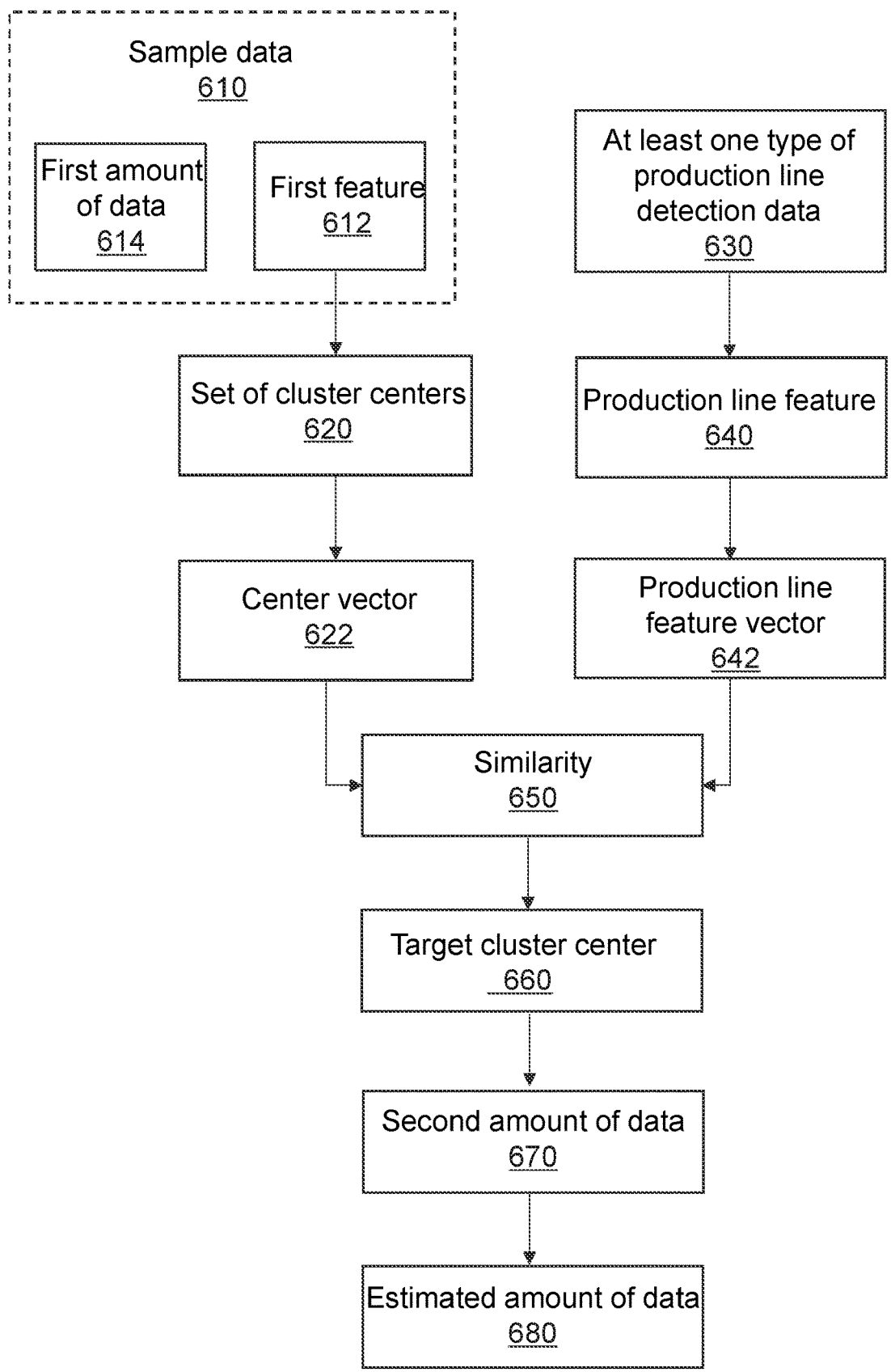
FIG. 6 is a schematic diagram illustrating a process for determining an estimated amount of data according to some embodiments of the present disclosure.

FIG. 6 is a schematic diagram illustrating a process of determining an estimated amount of data according to some embodiments of the present disclosure.

In some embodiments, the sensor network platform may obtain a plurality of sample data 610, each sample data 610 includes a first feature 612 of a production line and a corresponding first amount of data 614.

The sample data may be historical production line detection data. In some embodiments, the sample data is detected by the at least one production line sensor of the object platform. The first feature may be a production line feature corresponding to the sample data, and the first amount of data may be the amount of data corresponding to the sample data.

In some embodiments, the sensor network platform may cluster the plurality of sample data 610 based on the first feature 612 to obtain a set of cluster centers 620.

The first feature of the sample data may be represented by a feature vector, that is, the first feature vector. The element of the first feature vector may correspond to the first feature. In some embodiments, the element of the first feature vector may include an amount of production line devices, a product output, a product productivity, a production period, etc. In some embodiments, the sensor network platform may perform clustering on the first feature vector through a clustering algorithm to determine the set of cluster centers 620, where the set of cluster centers may include one or more cluster centers, for example, the sensor network platform may cluster the first feature vector through the clustering algorithm to obtain the set of cluster centers, and the set of cluster centers may include cluster center I and cluster center II.

In some embodiments, the clustering algorithm may include, but is not limited to, K-Means clustering, Density-Based Spatial Clustering of Applications with Noise (DBSCAN), etc.

In some embodiments, the sensor network platform may determine a production line feature 640 corresponding to the at least one type of production line detection data 630, and determine a target cluster center 660 corresponding to the at least one type of production line detection data 630 from the set of cluster centers 620 based on the production line feature 640. The target cluster center may be the cluster center with the closest distance to the production line feature vector corresponding to the at least one type of production line detection data in the set of cluster centers.

In some embodiments, when determining the corresponding target cluster center 660 based on the production line feature 640 corresponding to the at least one type of production line detection data 630, the sensor network platform may determine a center vector 622 of each cluster center in the set of cluster centers 620, obtain the production line feature vector 642 corresponding to the production line feature 640 from the at least one type of production line detection data 630, and finally determine the corresponding target cluster center 660 based on the similarity 650 between the center vector 622 and the production line feature vector 642.

In some embodiments, the sensor network platform may perform a feature extraction on the production line feature 640 to obtain a corresponding production line feature vector 642. Methods for the feature extraction may include but are not limited to a multi-layer perceptron mechanism, a convolutional neural network, a residual network, etc.

In some embodiments, for each cluster center, the sensor network platform may determine the mean vector of the first feature vectors of all sample data 610 in the cluster center as the center vector 622 of the cluster center.

In some embodiments, the sensor network platform may perform similarity calculation on each center vector 622 of the plurality of center vectors and the production line feature vector 642, and determine the target cluster center 660 according to the similarity 650. The methods for calculating the similarity may include but not limited to a cosine similarity, an Euclidean distance, a Pearson correlation coefficient, etc.

In some embodiments, after determining the target cluster center 660, the sensor network platform may determine the second amount of data 670 corresponding to the target cluster center 660, and determine the estimated amount of data 680 corresponding to the at least one type of production line detection data 630 based on the second amount of data 670 corresponding to the target cluster center 660.

The second amount of data may refer to the estimated amount of data corresponding to the target cluster center. In some embodiments, the second amount of data is associated with each sample data in the target cluster center. Exemplarily, the sensor network platform may determine the ratio of the sum of the amount of data of historical production line detection data corresponding to each sample data in the target cluster center to the number of sample data in the target cluster center as the second amount of data of the target cluster center, for example, the target cluster center contains a total of 5 sample data, and the amount of data of the corresponding historical production line detection data is 100, 200, 300, 200, and 100 in sequence, then the second amount of data of the target cluster center may be calculated as 180 by averaging the amount of data of the historical production line detection data.

Based on the clustering, the estimated amount of data of the production line detection data may be accurately reflected in combination with the actual situation, to facilitate the subsequent accurate determination of the estimated occupancy rate of the child node gateway device.

In some embodiments, when determining the estimated amount of data corresponding to the at least one type of production line detection data, the data divergence corresponding to the at least one type of production line detection data may also be determined.

The data divergence may reflect the average degree of deviation between the estimated amount of data corresponding to the at least one type of production line detection data and an average amount of data (that is, the average of the estimated amount of data of all production line detection data).

In some embodiments, the data divergence corresponding to the at least one type of production line detection data may be determined according to the data divergence of the target cluster center, and the data divergence of the target cluster center may be determined according to an average difference rate of the second amount of data of the target cluster center.

Exemplarily, the average difference rate of the second amount of data of the target cluster center may be calculated and determined by formula (4):

$$d = \frac{\sum_{i=1}^{n} |Q_i - p|}{n}, \quad (4)$$

where d denotes the average difference rate of the target cluster center, p denotes the second amount of data, Qi denotes the first amount of data of each sample data in the target cluster center, and n denotes the number of sample data in the target cluster center.

Further, the data divergence of the target cluster center may be calculated and determined by formula (5):

$$R = d/p \quad (5),$$

where R denotes the data divergence of the target cluster center, d denotes the average difference rate of the target cluster center, and p denotes the second amount of data.

In some embodiments, the larger d is, the larger the average degree of deviation between the first amount of data and the second amount of data of each sample data of the target cluster center is, and the more divergent the corresponding production line detection data is.

In some embodiments, after determining the data divergence of the target cluster center, the sensor network platform may use the data divergence of the target cluster center as the data divergence corresponding to the at least one type of production line detection data.

In some embodiments, the data divergence is negatively correlated with the first threshold and the second threshold, respectively. The size of the data divergence may affect the determination of the first threshold and the second threshold. For more content about the first threshold and the second threshold, please refer to step 530 and its related descriptions.

By using the average difference rate of the second amount of data of the target cluster center, the data divergence may be accurately determined, thereby making the determined first threshold and second threshold more accurate, and making the corresponding determined data processing method more accurate and more in line with the actual processing power of the gateway.

Having thus described the basic concepts, obviously, for those skilled in the art, the above detailed disclosure is merely a way of example, and does not constitute a limitation of the present disclosure. Although not explicitly described herein, various modifications, improvements, and corrections to the present disclosure may occur to those skilled in the art. Such modifications, improvements, and corrections are suggested in the present disclosure, so such modifications, improvements, and corrections still belong to the spirit and scope of the exemplary embodiments of the present disclosure.

Meanwhile, the present disclosure uses specific words to describe the embodiments of the present disclosure. Examples such as "one embodiment," "an embodiment," and/or "some embodiments" mean a certain feature, structure, or characteristic associated with at least one embodiment of the present disclosure. Therefore, it should be emphasized and noted that two or more references to "an embodiment" or "one embodiment" or "an alternative embodiment" in various places in the present disclosure are not necessarily referring to the same embodiment. Furthermore, certain features, structures or characteristics of the one or more embodiments of the present disclosure may be combined as appropriate.

Furthermore, unless explicitly stated in the claims, the order of processing elements and sequences, the use of alphanumerics, or the use of other names described in the present disclosure is not intended to limit the order of the processes and methods of the present disclosure. While the above disclosure discusses some presently believed useful embodiments of the present disclosure by way of various examples, but it is to be understood that such details are for purposes of illustration only and that the appended claims are not limited to the disclosed embodiments, but on the contrary, the claims are intended to cover all modifications and equivalent combinations that come within the spirit and scope of the embodiments of the present disclosure. For example, although the implementation of various components described above may be embodied in a hardware device, it may also be implemented as a software only solution, e.g., an installation on an existing server or mobile device.

Similarly, it should be noted that to simplify the expressions disclosed in the present disclosure and thus help the understanding of one or more embodiments of the disclosure, in the foregoing description of the embodiments of the present disclosure, various features may sometimes be combined into one embodiment, drawings or descriptions thereof. However, this method of disclosure does not imply that the subject matter of the description requires more features than that are recited in the claims. Rather, claimed subject matter may lie in less than all features of a single foregoing disclosed embodiment.

Some embodiments use numbers to describe quantities of ingredients and attributes, it should be understood that such numbers used to describe the embodiments, in some examples, use the modifiers "about", "approximately" or "substantially" to retouch. Unless stated otherwise, "about", "approximately" or "substantially" means that a variation of ±20% is allowed for the stated number. Accordingly, in some embodiments, the numerical parameters set forth in the present disclosure and claims are approximations that may vary depending on the desired characteristics of individual embodiments. In some embodiments, numerical parameters should take into account specified significant digits and use a general digit reservation method. Notwithstanding that the numerical fields and parameters used in some embodiments of the present disclosure to confirm the breadth of their ranges are approximations, in specific embodiments, such numerical values are set as precisely as practicable.

For each patent, patent application, patent application publication, and other material, such as article, book, disclosure, publication, document, etc., cited in the present disclosure, the entire contents of which are hereby incorporated into the present disclosure for reference. History application documents that are inconsistent or conflictive with the contents of the present disclosure are excluded, as well as documents (currently or subsequently appended to the present disclosure) limiting the broadest scope of the claims of the present disclosure. It should be noted that, if there is any inconsistency or conflict between the descriptions, definitions, and/or usage of terms in subsidiary information of the present disclosure and the contents of the present disclosure, the descriptions, definitions and/or usage of terms in the present disclosure shall prevail.

Finally, it should be understood that the embodiments described in the present disclosure are only used to illustrate the principles of the embodiments of the present disclosure. Other deformations are also possible within the scope of the present disclosure. Therefore, merely by way of example and not limitation, alternative configurations of the embodiments of the present disclosure may be considered consistent with the teachings of the present disclosure. Accordingly, the embodiments of the present disclosure are not limited to those embodiments expressly introduced and described in the present disclosure.

What is claimed is:

1. A method for controlling production line detection data, wherein a sensor network platform uses an arrangement of a front sub-platform, and the arrangement of the front sub-platform means that the sensor network platform includes a total platform and a plurality of sub-platforms, the sub-platforms are child node gateway devices in different communication networks, and the total platform is a total node gateway device aggregated by all the communication networks, the method being executed by the sensor network platform, the method comprising:
receiving a data request sent from a management platform, the data request including at least one type of production line detection data, the production line detection data being detected by at least one production line sensor of an object platform, wherein the at least one production line sensor is divided into multiple types according to a type of a communication protocol, and the multiple types of the production line sensor are added to different communication networks;
obtaining the detected production line detection data and storing it in the child node gateway devices or the total node gateway device;
based on the production line detection data included in the data request, retrieving the production line detection data from the total node gateway device or the child node gateway devices; and
sending the retrieved production line detection data to the management platform;
wherein the based on the production line detection data included in the data request, retrieving the production line detection data from the total node gateway device or the child node gateway devices comprises:
determining an estimated amount of data corresponding to the at least one type of the production line detection data;
determining an estimated occupancy rate of a child node gateway device corresponding to the at least one type of the production line detection data based on the estimated amount of data; and
when the estimated occupancy rate is larger than a first threshold, retrieving the production line detection data from the total node gateway device.

2. The method of claim 1, wherein the determining an estimated amount of data corresponding to the at least one type of the production line detection data comprises:
obtaining a plurality of sample data, each sample data including a first feature of a production line and a first amount of data corresponding to the sample data;
clustering the plurality of sample data to obtain a set of cluster centers based on the first feature of the each sample data;
determining a production line feature corresponding to the at least one type of the production line detection data;
determining a target cluster center corresponding to the at least one type of the production line detection data from the set of cluster centers based on the production line feature;
determining a second amount of data corresponding to the target cluster center; and
determining the estimated amount of data corresponding to the at least one type of the production line detection data based on the second amount of data of the target cluster center.

3. The method of claim 2, further comprising: determining a data divergence corresponding to the at least one type of the production line detection data, the data divergence being negatively correlated with the first threshold.

4. The method of claim 1, wherein the determining an estimated occupancy rate of the child node gateway device corresponding to the at least one type of the production line detection data based on the estimated amount of data comprises:
determining a first data carrying capacity of the child node gateway device; and
determining the estimated occupancy rate of the child node gateway device based on the first data carrying capacity and the estimated amount of data.

5. The method of claim 4, wherein the determining a first data carrying capacity of the child node gateway device comprises:
processing a gateway capacity of the child node gateway device and a feature of an environment where the child node gateway device is located by using a determination model to determine the first data carrying capacity of the child node gateway device, wherein the feature of the environment where the child node gateway device is located includes at least an amount of transmission channels, an amount of connected devices, and a data transmission feature of each device, the determination model is a machine learning model.

6. The method of claim 1, further comprising:
determining an occupancy rate ranking of the child node gateway device corresponding to the at least one type of the production line detection data;
determining at least one preselected data based on the occupancy rate ranking and a second preset value;
determining an allocation occupancy rate of the total node gateway device corresponding to the at least one preselected data;
determining at least one target detection data based on the allocated occupancy rate and a second threshold; and
retrieving the at least one target detection data from the total node gateway device.

7. The method of claim 6, wherein the determining the allocation occupancy rate of the total node gateway device corresponding to the at least one preselected data comprises:
determining a second data carrying capacity of the total node gateway device; and
determining the allocation occupancy rate of the total node gateway device based on an estimated amount of data corresponding to the at least one preselected data and the second data carrying capacity.

8. A non-transitory computer-readable storage medium storing computer instructions, wherein when reading the computer instructions in the storage medium, a computer implements the method of claim 1.

9. An industrial Internet of things system for controlling production line detection data, comprising a user platform, a service platform, a management platform, a sensor network platform, and an object platform that interact in sequence, wherein:

the service platform and the management platform use a centralized arrangement, and the centralized arrangement means that any platform uniformly receives data, uniformly processes data, and uniformly sends data;

the management platform is used to send a data request and receive production line detection data;

the sensor network platform uses an arrangement of a front sub-platform, and the arrangement of the front sub-platform means that the sensor network platform includes a total platform and a plurality of sub-platforms, the sub-platforms are child node gateway devices in different communication networks, and the total platform is a total node gateway device aggregated by all the communication networks, the sensor network platform is configured to:

receive a data request sent from a management platform, the data request including at least one type of production line detection data, the production line detection data being detected by at least one production line sensor of the object platform, wherein the at least one production line sensor is divided into multiple types according to a type of a communication protocol, and the multiple types of the production line sensor are added to different communication networks;

obtain the detected production line detection data and store it in the child node gateway devices or the total node gateway device;

based on the production line detection data included in the data request, retrieve the production line detection data from the total node gateway device or the child node gateway devices; and send the retrieved production line detection data to the management platform;

wherein based on the production line detection data included in the data request, to retrieve the production line detection data from the total node gateway device or the child node gateway devices, the sensor network platform is further configured to:

determine an estimated amount of data corresponding to the at least one type of the production line detection data;

determine an estimated occupancy rate of a child node gateway device corresponding to the at least one type of the production line detection data based on the estimated amount of data; and when the estimated occupancy rate is larger than a first threshold, retrieve the production line detection data from the total node gateway device.

10. The industrial Internet of things system of claim 9, wherein to determine an estimated amount of data corresponding to the at least one type of the production line detection data, the sensor network platform is configured to:

obtain a plurality of sample data, each sample data including a first feature of a production line and a first amount of data corresponding to the sample data;

cluster the plurality of sample data to obtain a set of cluster centers based on the first feature of the each sample data;

determine a production line feature corresponding to the at least one type of the production line detection data;

determine a target cluster center corresponding to the at least one type of the production line detection data from the set of cluster centers based on the production line feature;

determine a second amount of data corresponding to the target cluster center; and determine the estimated amount of data corresponding to the at least one type of the production line detection data based on the second amount of data of the target cluster center.

11. The industrial Internet of things system of claim 10, wherein the sensor network platform is further configured to:

determine a data divergence corresponding to the at least one type of the production line detection data, the data divergence being negatively correlated with the first threshold.

12. The industrial Internet of things system of claim 9, wherein to determine an estimated occupancy rate of the child node gateway device corresponding to the at least one type of the production line detection data based on the estimated amount of data, the sensor network platform is further configured to:

determine a first data carrying capacity of the child node gateway device; and determine the estimated occupancy rate of the child node gateway device based on the first data carrying capacity and the estimated amount of data.

13. The industrial Internet of things system of claim 12, wherein to determine a first data carrying capacity of the child node gateway device, the sensor network platform is further configured to:

process a gateway capacity of the child node gateway device and a feature of an environment where the child node gateway device is located by using a determination model to determine the first data carrying capacity of the child node gateway device, wherein the feature of the environment where the child node gateway device is located includes at least an amount of transmission channels, an amount of connected devices, and a data transmission feature of each device, the determination model is a machine learning model.

14. The industrial Internet of things system of claim 9, wherein the sensor network platform is further configured to:

determine an occupancy rate ranking of the child node gateway device corresponding to the at least one type of the production line detection data;

determine at least one preselected data based on the occupancy rate ranking and a second preset value;

determine an allocation occupancy rate of the total node gateway device corresponding to the at least one preselected data;

determine at least one target detection data based on the allocated occupancy rate and a second threshold; and retrieve the at least one target detection data from the total node gateway device.

15. The industrial Internet of things system of claim 14, wherein to determine the allocation occupancy rate of the total node gateway device corresponding to the at least one preselected data, the sensor network platform is further configured to:

determine a second data carrying capacity of the total node gateway device; and determine the allocation occupancy rate of the total node gateway device based on an estimated amount of data corresponding to the at least one preselected data and the second data carrying capacity.

* * * * *